Patented June 20, 1933

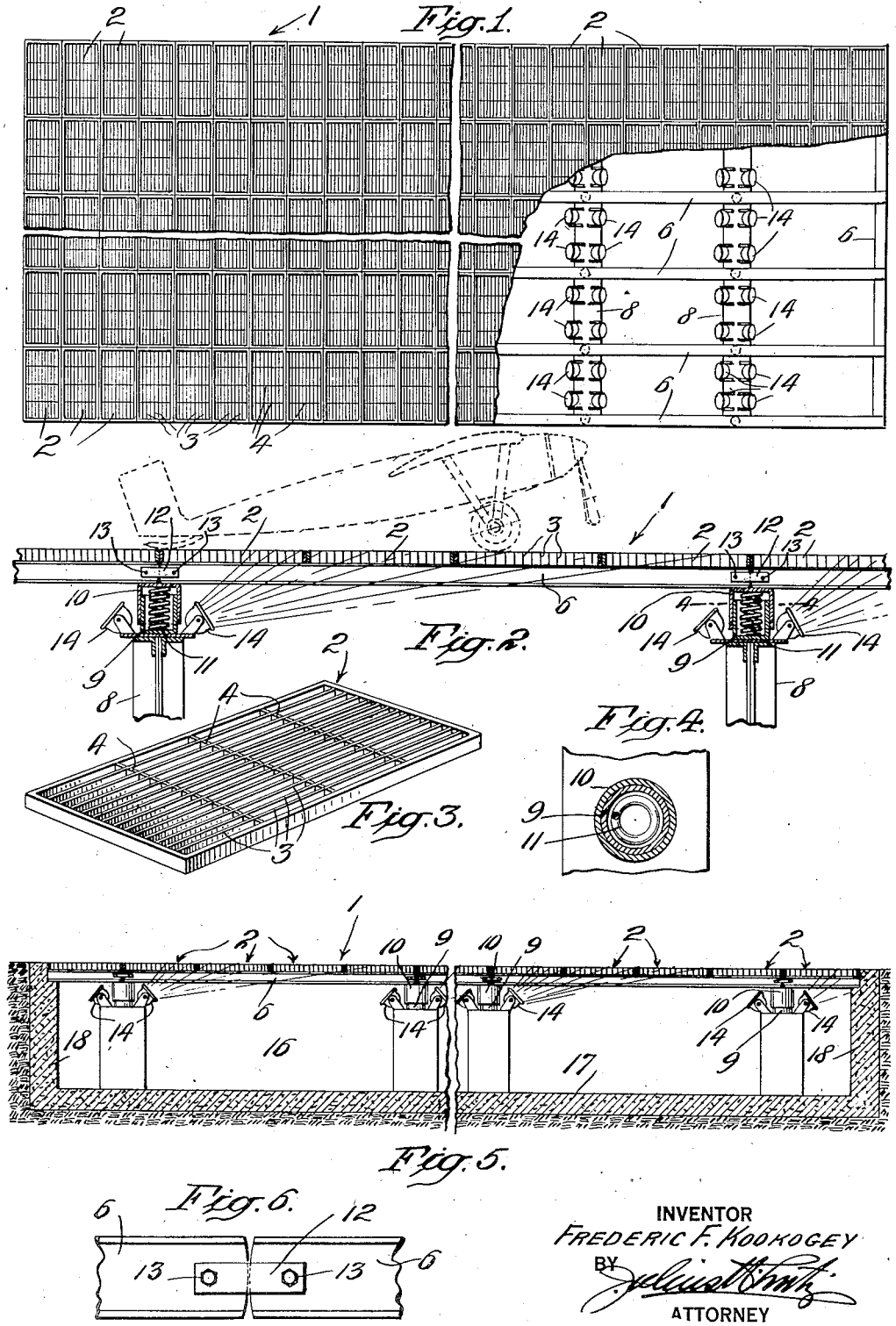

1,914,573

UNITED STATES PATENT OFFICE

FREDERIC F. KOOKOGEY, OF NEW YORK, N. Y.

LANDING DECK FOR AIRCRAFT

Application filed May 28, 1931. Serial No. 540,689.

This invention relates to landing or deck structures for airports or landing areas for airplanes and the like and comprises an improved landing surface structure of grid or lattice formation providing a lever, non-skid surface adapted to be free of water, snow and ice accumulations with resulting reduction of maintenance requirements and desirably having associated therewith a lighting arrangement for illuminating the landing area from below and through the grid structure thereby to effect a more direct lighting of the landing surface and more effective guidance to the pilot in making landing contacts.

In its approved embodiment, my improved landing deck structure may further be structurally arranged to be yielding under impact to contribute in absorbing the shock of landing aircraft. In the preferred construction, the grid and underlying lighting means are arranged for effectively lighting the deck or landing surface while avoiding glare such as would be caused by direct exposure of the light source from the normal angle of landing approach. The lighting arrangement, as so provided, gives in effect a directly illuminated landing deck, avoidance of glare conditions and allows of light and other maintenance from below without danger to the operators or inteference to deck activities.

The foregoing and other important features and advantages of the present improvements will be more fully understood by reference to the accompanying drawing wherein like reference characters are applied to the corresponding parts in the several views.

In the drawing:

Fig. 1 is a plan view of my improved aircraft landing deck structure with a portion broken away to show the under structure.

Fig. 2 is a view thereof in vertical, longitudinal section.

Fig. 3 is a perspective view of one of the deck grid sections.

Fig. 4 is a horizontal sectional view, on line 4—4 of Fig. 2, showing the resilient mounting construction.

Fig. 5 is a vertical, longitudinal view of a landing deck surface and associated pit construction as employed in land airports.

Fig. 6 is an enlarged, detail view of the grid supporting structure showing the provision for the yielding effect at the pedestals.

In the desirable embodiment of the features of my invention, as here shown, 1 indicates the landing deck structure composed of grid or grating sections having rectangular, marginal frame members 2, closely spaced, longitudinally parallel grid bars 3 and cross bracing bars 4; the respective grid members having their upper surfaces in a common plane. As shown, these grid sections are united, by rivets or welding, in a horizontal plane assembly to give the required deck area and form and are supported upon suitably spaced girders or beams 6 of a supporting structure.

The supporting structure, in accordance with a further feature of my invention, consists of girder uprights or pedestals 8 upon which are supported inner, spring bearing or casing members 9 to which are fitted outer casing members 10 in vertically telescoping relation and having heavy compression springs 11 within the casing so formed. Upon the upper bearing surface of the members 10, the means 6 have bearing support to the end that the deck structure is resiliently supported to be yieldable under the pressures of impact to absorb or reduce the shock of landing planes. For the purpose of localizing the resilient action, the grid areas are sectionally divided in a lateral plane, central of the supports or pedestals, as shown in Fig. 2. The beams likewise have a division in the same plane and are connected by plates 12 secured to each beam by a pivotal bolt 13. The ends of the beams 6 are curved in contour as best shown in Fig. 6 whereby the arrangement allows of localized depression of the grid surface to give a cushioning action as will be readily understood.

In further accordance with the present invention, lighting means are provided and positioned in the space beneath the grid deck to effect illuminating of the landing area by projection of the lighting rays therethrough and upon the grid bars. As here shown, the lighting means consists of a battery of electric lamps positioned in reflector shades or troughs 14 mounted upon horizontal members of the pedestals in position to direct the rays upwardly against and through the grids from either direction. As will be readily understood, the spacing and depth of the grid bars may be such, with relation to the positioning of the lamps, as to avoid direct projection of the light rays against the aircraft in the normal angle of approach, thereby to insure against confusing glare.

My improved landing deck when employed on roofs of buildings, decks of ships, seadromes or like structures are suitably elevated to give the desired clearances for lamp and other maintenance from below the deck and may be provided with suitable cat-walks where the elevations require. In the instance of its use for aprons and runways of land fields or airports, as shown in Fig. 5, the deck is arranged in the plane of the ground level with a suitable maintenance pit 16 beneath enclosed by suitable masonry flooring 17 and side walls 18. Also as will be readily understood, the spacing of the grid bars is of sufficiently close relation to provide a safe foot tread surface.

The improved construction as described provides a level deck or surface, having openings therethrough upon which snow and water will not collect, a surface of non-skid character upon which ice can not form in dangerous quantity, a surface which can be maintained from the underside and thus give the maximum protection to those maintaining the deck, inspecting and replacing the lights &c thereby offering protection to the person and reduced interference to the aircraft. It further offers a landing surface or deck that can be uniformly lighted to any degree of brilliancy without glare or blinding of pilots and in its preferred form as shown will contribute in absorbing the shock of landing aircraft.

While I have shown and described an approved embodiment of the features of my invention, it will be understood that various modifications may be made therein without departing from the scope of the invention as defined in the appended claims.

Having described my invention, I claim:

1. A landing deck for aircraft comprising a surface provided by grid-like sections and lighting means associated therewith and positioned to project illuminating rays upwardly through the grid sections, said grid sections having tread bars vertically arranged in close spaced relation and of a depth to prohibit projection of the rays between the bars at the normal angle of approach of landing aircraft.

2. A landing deck for aircraft composed of articulated, rectangular, grid-like sections and supporting means therefor to support the sections with a maintenance clearance therebeneath, lighting means positioned beneath the sections and arranged for illuminating the sections by projection of light rays upwardly thereagainst from either direction, said supporting means including resilient supports adapted to absorb the shocks of landing air-craft.

3. A landing deck for aircraft composed of grid-like sections united to provide divisional surface areas, means to support the divisional areas, said supporting means comprising pedestals positioned mutual to abutting divisional areas and resilient bearing members mounted on the pedestals, said bearing members comprising upper and lower casing members in telescoping relation and compression springs within the casing members, substantially as described.

4. A landing deck for aircraft composed of grid-like structure united to provide articulated divisional surface areas, means to support the divisional areas, said supporting means comprising pedestals positioned mutual to abutting divisional areas and adapted to support the deck with a maintenance space therebeneath, said supporting means including resilient bearing members mounted upon the pedestals, substantially as described.

5. A landing deck for aircraft comprising a surface composed of a grid-like structure and lighting means therefor positioned below the plane of the surface to project illuminating rays upwardly thereagainst in angular relation to prohibit projection through the grid openings at the normal angle of approach of landing craft.

6. A landing deck for aircraft composed of grid-like structure united to provide divisional surface areas, means to support the divisional areas at their abutting marginal portions comprising resilient acting supporting members positioned in mutual supporting relation to abutting surface areas and adapted to permit localized yielding of the deck surface to absorb the shocks of landing aircraft.

Signed at New York city, in the county of New York and State of New York, this 22nd day of May A.D. 1931.

FREDERIC F. KOOKOGEY.